(12) United States Patent
Ringer et al.

(10) Patent No.: US 11,781,658 B2
(45) Date of Patent: Oct. 10, 2023

(54) BALL VALVE ASSEMBLY

(71) Applicant: Victaulic Company, Easton, PA (US)

(72) Inventors: Yoram Ringer, Providence, RI (US); Stephen J. Meyer, Chester Springs, PA (US); Gordon Farrell, North Conway, NH (US); Fang Huang, Xi'an Shaanxi (CN)

(73) Assignee: VICTAULIC COMPANY, Easton, PA (US)

( * ) Notice: Subject to any disclaimer, the term of this patent is extended or adjusted under 35 U.S.C. 154(b) by 0 days.

(21) Appl. No.: 17/761,903

(22) PCT Filed: Sep. 18, 2020

(86) PCT No.: PCT/US2020/051466
§ 371 (c)(1),
(2) Date: Mar. 18, 2022

(87) PCT Pub. No.: WO2021/055730
PCT Pub. Date: Mar. 25, 2021

(65) Prior Publication Data
US 2022/0390022 A1    Dec. 8, 2022

Related U.S. Application Data

(60) Provisional application No. 62/903,325, filed on Sep. 20, 2019.

(51) Int. Cl.
*F16K 5/06*  (2006.01)
*F16K 27/06* (2006.01)
(Continued)

(52) U.S. Cl.
CPC ............ *F16K 5/201* (2013.01); *F16K 5/0605* (2013.01); *F16K 5/205* (2013.01); *F16K 15/033* (2013.01);
(Continued)

(58) Field of Classification Search
CPC .... F16K 5/0605; F16K 15/1848; F16K 5/201; F16K 5/205
See application file for complete search history.

(56) References Cited

U.S. PATENT DOCUMENTS

RE11,988 E    5/1902   Gray
1,359,327 A  11/1920   Campbell
(Continued)

FOREIGN PATENT DOCUMENTS

CA       753464 A    2/1967
CN      1419108 A    5/2003
(Continued)

OTHER PUBLICATIONS

TESTANDRAIN; Valve Repair Kit; AGI Manufacturing, Inc.; 2018-2016; Downloaded from web page: http://www.agmanufacturing.com/documents/support.html; 2 pages (admitted prior art at least as early as Oct. 10, 2016).
(Continued)

*Primary Examiner* — Kevin R Barss
(74) *Attorney, Agent, or Firm* — Panitch Schwarze Belisario & Nadel LLP

(57) ABSTRACT

A control valve assembly includes a valve body defining an inlet, an outlet and a fluid flow pathway therebetween. A ball valve is positioned within the fluid flow pathway and includes a rotatable ball having an inlet opening, an outlet opening and a flow pathway therebetween, an upstream seat ring positioned at an inlet side of the ball, and a downstream seat ring positioned at a downstream side of the ball, the seat rings being configured to substantially seal off fluid flow
(Continued)

between upstream and downstream sides of the ball except through the ball fluid flow pathway. At least one of the upstream and downstream seat rings is a dynamic sealing seat ring. A retainer ring is positioned between the dynamic sealing seat ring and a portion of the rotatable ball to substantially prevent deformation of a portion of the dynamic sealing seat ring in a direction toward the ball.

12 Claims, 5 Drawing Sheets

(51) Int. Cl.
    *F16K 5/20*     (2006.01)
    *F16K 15/18*     (2006.01)
    *F16K 15/03*     (2006.01)

(52) U.S. Cl.
    CPC ........ *F16K 15/1848* (2021.08); *F16K 27/067* (2013.01)

(56) References Cited

U.S. PATENT DOCUMENTS

| | | |
|---|---|---|
| 1,900,632 A | 3/1933 | Boardman |
| 2,011,603 A | 8/1935 | Allan |
| 2,151,098 A | 3/1939 | Greenwood |
| 2,505,761 A | 5/1950 | Gieseler |
| 2,667,934 A | 2/1954 | Rowley |
| 3,195,857 A | 7/1965 | Shafer |
| 3,363,650 A | 1/1968 | Scaramucci |
| 3,448,442 A | 6/1969 | Hube |
| 3,451,482 A | 6/1969 | Kjaergaard |
| 3,474,818 A | 10/1969 | Hartman |
| 3,707,161 A | 12/1972 | Crawford |
| 3,809,112 A | 5/1974 | Herbello |
| 3,854,497 A | 12/1974 | Rosenberg |
| 3,883,111 A | 5/1975 | Jourdan |
| 3,897,804 A | 8/1975 | Buck et al. |
| 4,367,861 A | 1/1983 | Bray et al. |
| 4,605,199 A | 8/1986 | Bonissone et al. |
| 4,643,224 A | 2/1987 | Rung et al. |
| 4,655,078 A | 4/1987 | Johnson |
| 4,665,078 A | 5/1987 | Sach |
| 4,729,403 A | 3/1988 | Roche |
| 4,741,361 A | 5/1988 | McHugh |
| 4,846,221 A | 7/1989 | Kanemaru |
| 4,852,610 A | 8/1989 | McHugh |
| 4,928,725 A | 5/1990 | Graves |
| 4,932,436 A | 6/1990 | Kanemaru |
| 4,971,109 A | 11/1990 | McHugh |
| 4,989,631 A | 2/1991 | Harbin |
| 4,991,655 A | 2/1991 | McHugh |
| 5,004,005 A | 4/1991 | Graves |
| 5,018,386 A | 5/1991 | Zeoli |
| 5,103,862 A | 4/1992 | McHugh |
| 5,137,259 A | 8/1992 | Stein |
| 5,141,018 A | 8/1992 | Guterman |
| 5,154,232 A | 10/1992 | McHugh |
| 5,295,503 A | 3/1994 | Meyer et al. |
| 5,297,635 A | 3/1994 | McHugh |
| 5,373,868 A | 12/1994 | Rodriguez |
| 5,439,028 A | 8/1995 | Meyer et al. |
| 5,551,749 A | 9/1996 | Reher et al. |
| 5,662,139 A | 9/1997 | Lish |
| 5,669,405 A | 9/1997 | Engelmann |
| 5,794,655 A | 8/1998 | Funderburk et al. |
| 5,944,051 A | 8/1999 | Johnson |
| 5,971,080 A | 10/1999 | Loh et al. |
| 6,000,473 A | 12/1999 | Reilly |
| 6,076,545 A | 6/2000 | Cooper |
| 6,098,659 A | 8/2000 | Mannis |
| 6,186,169 B1 | 2/2001 | McHugh |
| 6,196,262 B1 | 3/2001 | Giacomini |
| 6,328,052 B1 | 12/2001 | Loyning |
| 6,333,689 B1 | 12/2001 | Young |
| 6,341,622 B1 | 1/2002 | McHugh |
| 6,343,615 B1 | 2/2002 | Miller et al. |
| 6,396,404 B1 | 5/2002 | McHugh |
| 6,491,056 B2 | 12/2002 | Gibb |
| 6,601,604 B1 | 8/2003 | Cooper |
| 6,810,910 B2 | 11/2004 | McHugh |
| 6,857,478 B1 | 2/2005 | Weber |
| 6,860,331 B2 | 3/2005 | Hagen et al. |
| 7,147,002 B2 | 12/2006 | Reilly |
| 7,543,653 B2 | 6/2009 | Reilly et al. |
| 7,845,424 B1 | 12/2010 | Miller |
| 8,051,915 B2 | 11/2011 | Blease et al. |
| 8,128,058 B2 | 3/2012 | Quinn et al. |
| 8,333,214 B2 | 12/2012 | Ellis |
| 8,443,908 B2 | 5/2013 | McHugh, IV |
| 8,727,029 B2 | 5/2014 | Feenstra |
| 8,727,030 B2 | 5/2014 | Feenstra |
| 8,813,859 B2 | 8/2014 | Schlatter |
| 9,022,132 B2 | 5/2015 | Feenstra |
| 9,032,994 B2 | 5/2015 | McHugh et al. |
| 9,265,980 B2 | 2/2016 | Johnson |
| 10,774,937 B2 | 9/2020 | Ringer et al. |
| 10,900,208 B2 | 1/2021 | Tanghetti et al. |
| 2002/0014270 A1 | 2/2002 | McHugh |
| 2002/0108759 A1 | 8/2002 | Hagen et al. |
| 2003/0062329 A1 | 4/2003 | Alley |
| 2004/0000337 A1 | 1/2004 | Cooper |
| 2004/0231862 A1 | 11/2004 | Kim et al. |
| 2006/0213556 A1 | 9/2006 | Royse |
| 2007/0267202 A1 | 11/2007 | Mariller |
| 2007/0289751 A1 | 12/2007 | Feenstra et al. |
| 2008/0099073 A1 | 5/2008 | Lauber et al. |
| 2008/0308159 A1 | 12/2008 | Stunkard |
| 2009/0001309 A1 | 1/2009 | Sprakel et al. |
| 2009/0188567 A1 | 7/2009 | McHugh |
| 2010/0132806 A1 | 6/2010 | Burczynski |
| 2010/0155642 A1 | 6/2010 | Weston et al. |
| 2010/0200791 A1 | 8/2010 | Yung et al. |
| 2011/0062366 A1 | 3/2011 | Thomas |
| 2011/0120737 A1 | 5/2011 | Flynn |
| 2011/0253395 A1 | 10/2011 | Long |
| 2011/0315406 A1 | 12/2011 | Connery et al. |
| 2012/0055686 A1 | 3/2012 | McHugh, IV |
| 2012/0103637 A1 | 5/2012 | Karihara et al. |
| 2013/0032236 A1 | 2/2013 | Ringer et al. |
| 2014/0096848 A1 | 4/2014 | Weng et al. |
| 2014/0374125 A1 | 12/2014 | Johnson |
| 2015/0107708 A1 | 4/2015 | Oltman et al. |
| 2015/0192216 A1 | 7/2015 | Mesner et al. |
| 2015/0265866 A1 | 9/2015 | Kochelek et al. |
| 2016/0008645 A1 | 1/2016 | Deurloo |
| 2017/0225021 A1 | 8/2017 | Williams et al. |
| 2018/0043197 A1 | 2/2018 | Ringer et al. |
| 2018/0149275 A1 | 5/2018 | Rizzio |

FOREIGN PATENT DOCUMENTS

| | | |
|---|---|---|
| CN | 2724762 Y | 9/2005 |
| CN | 202420010 U | 9/2012 |
| CN | 102203476 B | 11/2014 |
| CN | 105465090 A | 4/2016 |
| CN | 106246950 A | 12/2016 |
| DE | 8808536 U1 | 11/1988 |
| EP | 1830009 A1 | 9/2007 |
| GB | 2157809 A | 10/1985 |
| GB | 2275757 A | 9/1994 |
| JP | 3016462 U | 10/1995 |
| JP | 2000176040 A | 6/2000 |
| JP | 2003149021 A | 5/2003 |
| JP | 2007003377 A | 1/2007 |
| JP | 2008544808 A | 12/2008 |
| JP | 2011036530 A | 2/2011 |
| JP | 2012011023 A | 1/2012 |
| JP | 2014188092 A | 10/2014 |
| KR | 200363612 Y1 | 10/2004 |
| KR | 20110056848 A | 5/2011 |
| KR | 20120044613 A | 5/2012 |

(56) References Cited

FOREIGN PATENT DOCUMENTS

| | | | |
|---|---|---|---|
| KR | 20130046053 A | 5/2013 | |
| WO | 2009020286 A1 | 2/2009 | |
| WO | 2019190609 A1 | 10/2019 | |

OTHER PUBLICATIONS

TESTANDRAIN; Replace or Install Pressure Relief Valve; AGI Manufacturing, Inc.; Downloaded from web page: http://www.testandrain.com/downloads/pdf/prv_change_out.pdf; 1 page (admitted prior art at least as early as Nov. 13, 2013).
Full Port Ball Valve with Integral Check Valve, Valve Cimberio, cim 356.1.
Int'l Search Report and Written Opinion dated Dec. 18, 2020 in Int'l Application No. PCT/US20/51466.
Installation Model 530C and LF530C Calibrated Pressure Relief Valve; Model 53, LF53, 111 and LF111 Pressure Relief Valves, Watts, 2013.
McMaster-Carr, Catalog No. 117, 4 pages, 2011.
Full Port Ball Valve with Integral Check Valve, Valve Cimberio, cim 356.1, Published at least as of Aug. 10, 2016.

BALL VALVE ASSEMBLY

CROSS-REFERENCE TO RELATED APPLICATIONS

This application is a Section 371 of International Application No. PCT/US20/51466. filed Sep. 18, 2020, which was published on Mar. 25, 2021, under International Publication No. WO 2021/055730 A1, which claims priority from U.S. Provisional Patent Application 62/903,427, titled "Fire Protection Valve Assembly", filed on Sep. 20, 2019, the entire contents of which are incorporated by reference herein.

BACKGROUND OF THE DISCLOSURE

The present disclosure is generally directed to a fluid flow valve assembly, and, more particularly, to a ball valve assembly.

Prior to commercialization, fluid flow control valves are subjected to rigorous testing to ensure that they conform to high safety standards. As one example, safety testing performed for certification by FM Approvals for ball valves used in certain fire protection applications requires valves to be subjected to conditions that generally far exceed normal operating conditions for the respective valves. For example, leak testing of valves requires cycling of the valves between fully open and fully closed positions a predetermined number of cycles that exceeds the number of cycles such valves are expected to experience during their life span under normal operating conditions. Likewise, testing may be performed under system pressurization that exceeds standard operating pressure. Such rigorous testing exposes the valves to harsh conditions that have the potential to result in premature wear of valve components. Accordingly, it is necessary to manufacture robust valves designed to withstand such testing in order to achieve the highest levels of safety certification.

BRIEF SUMMARY OF THE DISCLOSURE

Briefly stated, one aspect of the present disclosure is directed to a control valve assembly. The control valve assembly includes a valve body defining an inlet, an outlet and a valve body fluid flow pathway therebetween. A quarter-turn ball valve is positioned within the valve body fluid flow pathway and includes a rotatable ball having an inlet opening, an outlet opening and a ball fluid flow pathway therebetween, an upstream seat ring positioned at an inlet side of the ball, and a downstream seat ring positioned at a downstream side of the ball. The upstream and downstream seat rings are configured to substantially seal off fluid flow between an upstream side and a downstream side of the ball except through the ball fluid flow pathway. At least one of the upstream and downstream seat rings is a dynamic sealing seat ring. A retainer ring is positioned between the dynamic sealing seat ring and a portion of the rotatable ball and configured to substantially prevent deformation of a portion of the dynamic sealing seat ring in a direction toward the ball. A valve actuation assembly is configured to selectively rotate the ball substantially 90° between only two operative positions. A first operative position is an open position, fluidly connecting the ball fluid flow pathway with the valve body fluid flow pathway to permit fluid flow from the inlet to the outlet of the valve body through the ball. A second operative position is a closed position, substantially fluidly disconnecting the ball fluid flow path from the valve body fluid flow path to substantially prevent fluid flow from the inlet to the outlet of the valve body. The valve actuation assembly includes a stem extending from outside the valve body, through a first side thereof and into rotationally fixed attachment with the ball, whereby rotation of the stem rotates the ball between the open and closed positions thereof irrespective of a pressure differential across the ball.

BRIEF DESCRIPTION OF THE DRAWINGS

The following description of an embodiment of the disclosure will be better understood when read in conjunction with the appended drawings. It should be understood, however, that the disclosure is not limited to the precise arrangements and instrumentalities shown. In the drawings.

DESCRIPTION OF THE DISCLOSURE

Figure 1:
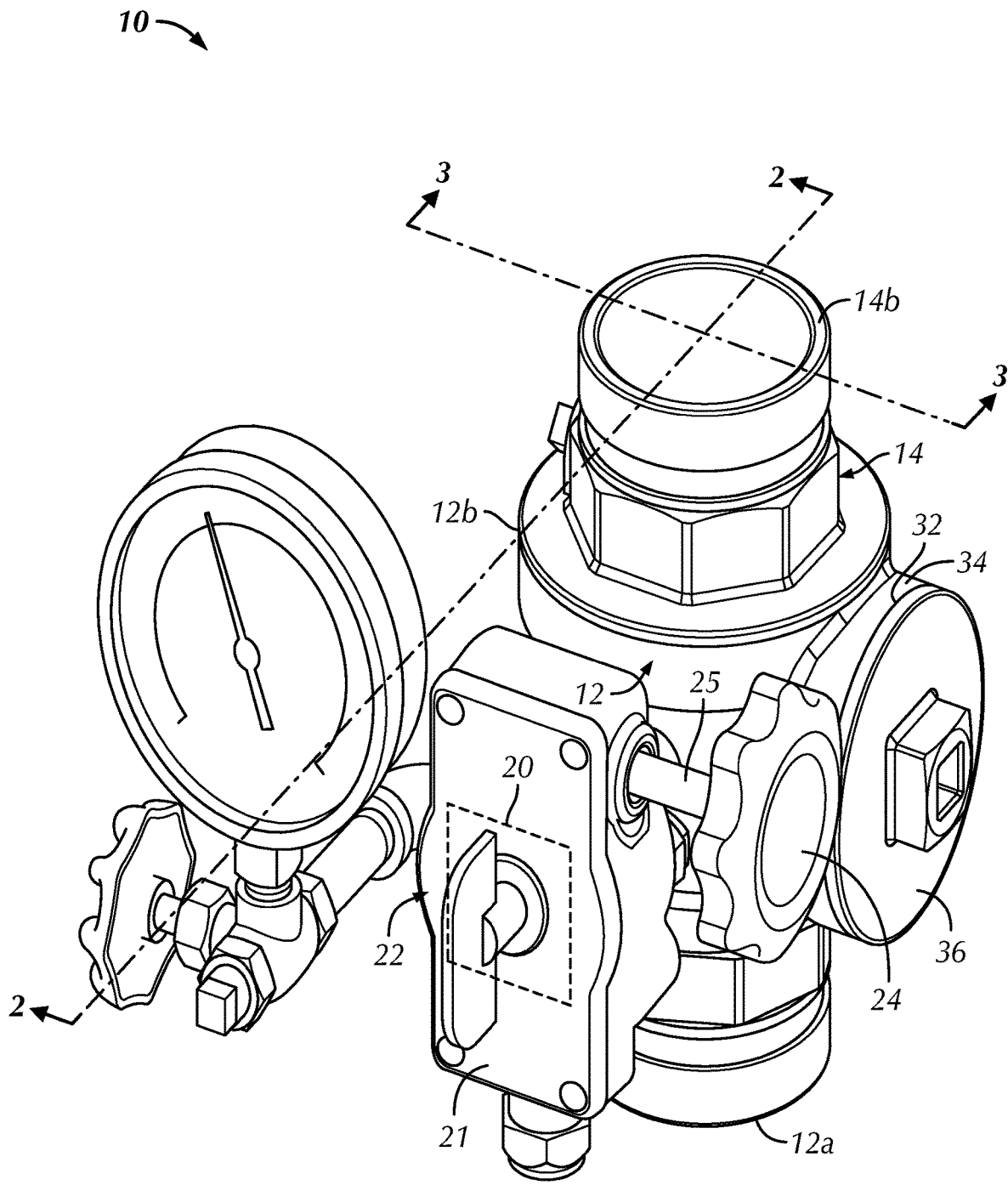
FIG. 1 is a perspective front and side view of a control valve assembly according to an embodiment of the present disclosure.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the control valve assembly, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-5 a piping system control valve assembly ("CVA"), generally designated 10, in accordance with an embodiment of the present disclosure. In one, non-limiting application, the CVA 10 is a fire protection valve assembly utilized in a wet standpipe (not shown) for a multi-floor property sprinkler system (not shown). In a fire protection application, and as should be understood by those of ordinary skill in the art, the wet standpipe extends generally vertically through the floors of the property, and a CVA 10 branches off the standpipe at each of the respective floors. Each CVA 10 of a respective floor connects water in the standpipe with the sprinklers on that respective floor. The CVA 10 may also control draining of the sprinkler system for testing and maintenance, and where the CVA 10 includes a control valve (as described in detail further below), the CVA 10 may also control shutting off water flow to the sprinklers, e.g., at the end of a fire. However, the disclosure of the CVA 10 herein is not so limited as the CVA 10 may alternatively be employed in different types of fluid flow/piping system applications, including those entirely unrelated to fire protection.

The CVA 10 includes a generally cylindrical valve body 12 and a valve body bonnet 14 removably mounted to the top (according to the orientation of the CVA 10 depicted in FIGS. 1-5) of the valve body 12. In the illustrated embodiment, an inlet 14a of the bonnet 14 is threadably connected to an outlet 12b of the valve body 12, whereby the bonnet 14 acts as a cover portion of the valve body 12, but the disclosure is not so limited. As should be understood, other fastening means capable of attaching and detaching the bonnet 14 with the valve body 12 may be utilized, such as, for example, without limitation, fastening bolts/nuts or the like. As also should be understood by those of ordinary skill in the art, the bonnet 14 may alternatively be removably mounted to a base end (according to the orientation of the CVA 10 depicted in FIGS. 1-5) of the valve body 12, i.e., to an inlet 12a of the valve body 12. In the illustrated configuration, the valve body 12 defines a main inlet 12a of the CVA 10 at the base end thereof for receiving fluid (e.g., water) from a fluid source, such as a wet standpipe, for example, and the bonnet 14 defines a main outlet 14b of the CVA 10 at an uppermost end thereof (according to the same orientation of the CVA 10 depicted in FIGS. 1-5), through which the fluid exits from the CVA 10, for example to a set of sprinklers (not shown). In one embodiment, both ends 12a, 14b may have respective outer peripheral grooves for mating in a conventional fashion with other fittings or pipe lengths. Alternatively, one or both ends 12a, 14b could be threaded, flanged or the like for other types of conventional mating.

The CVA 10 may be manually shut off (as will be described in further detail below) to stop fluid flow therethrough. For example, the CVA 10 may be manually shut off for maintenance purposes. In fire protection applications, as another non-limiting example, the CVA 10 may be manually shut off to turn off sprinklers once a fire event is extinguished. As should be understood by those of ordinary skill in the art, when utilizing the CVA 10 in a fire protection application, aside from closing the CVA 10 for maintenance purposes, the CVA 10 should generally be fully open at all times (other than after a fire event is extinguished) in order to ensure proper water flow to the sprinklers in the event of an emergency.

In the illustrated embodiment, and as shown best in FIGS. 2-5, the control valve takes the form of a ball valve 15. The ball valve 15 includes the valve body 12 housing a perforated and rotating/pivoting ball 16 therein, having a sealing seat ring 18a, i.e., an endless, e.g., annular, valve seat underlying the ball 16 on an inlet side 16a thereof and an opposing sealing seat ring 18b upon the ball 16 on an outlet side 16b thereof. As should be understood, the seat rings 18a, 18b may be formed of metal(s), polymer(s), combinations thereof, or the like. As also should be understood by those of ordinary skill in the art, the seat rings 18a, 18b are configured to seal off and substantially prevent fluid from flowing around the ball 16 between an upstream side and a downstream side thereof (as will be described in further detail below), thereby requiring fluid to travel through the ball 16 in order to travel between the upstream side and the downstream side thereof.

The outlet 12b of the valve body 12 is dimensioned to receive the internal components of the ball valve 15, e.g., the ball 16 and the seat rings 18a and 18b, therethrough. During manufacture, for example, the components of the ball valve 15 may be inserted into the valve body 12 via the outlet 12b, and, thereafter, the bonnet 14 is threaded onto the valve body 12. As shown in FIGS. 2-5, the bonnet 14 includes a downwardly projecting annular lip 14c dimensioned to engage, e.g., radially, the seat ring 18b to press against the seat ring 18b, and, in turn, against the ball 16 and against the lower seat ring 18a.

Turning to the ball valve 15, the ball 16 in the illustrated configuration takes the form of a substantially hollowed out ball 16 having an inlet opening 16a and an opposing outlet opening 16b. Optionally, the ball 16 may define an interior channel (not shown), e.g., a bored-out channel, extending between the inlet 16a and outlet 16b thereof. As should be understood by those of ordinary skill in the art, the ball valve 15 is a quarter-turn valve movable between only two operative positions. In a first operative position (FIGS. 2, 3), i.e., the open position, the inlet and outlet openings 16a, 16b of the ball 16 are substantially in line with the inlet 12a and the outlet 12b of the valve body 12. In a second operative position (FIG. 4), i.e., the closed position, the ball 16 is rotated substantially 90° about an axis across the diameter of the valve body 12, whereby the inlet and outlet openings 16a, 16b are substantially 90° offset from the inlet 12a and the outlet 12b of the valve body 12. The valve 15 substantially prevents fluid flow through the valve body 12 in the closed position (irrespective of a pressure differential across the ball valve 15) and permits fluid flow through the valve body 12 in the open position.

A valve actuation assembly 22 (FIG. 1) for selectively orienting (rotating) the ball valve 15 between the open and closed configurations thereof (irrespective of a pressure differential across the ball valve 15) may include a transmission 20 (shown schematically in FIG. 1), e.g., a conventional, commercially available, worm gear transmission, in a housing 21 with a control arm 25 rotatable by a hand wheel 24 connected thereto. A stem 23 is attached (in a rotatably fixed manner) with the ball 16 of the valve 15 at one end thereof and extends out of the valve body 12 into operative connection with the transmission 20 at the other end thereof.

Clockwise and counterclockwise rotation of the hand wheel 24 pivots the ball 16 between the open (FIGS. 2, 3) and closed (FIG. 4) positions thereof in a manner well understood by those of ordinary skill in the art, corresponding to open and closed configurations of the CVA 10, respectively. Namely, selective rotation of the hand wheel 24 rotates the control arm 25, which, in turn, rotates the stem 23 via the transmission 20, thereby rotating the ball 16 of the valve 15 between the open and closed configurations. Optionally, the transmission 20 may also provide a reduction ratio in a manner well understood by those of ordinary skill in the art. As should be understood, a reduction ratio provides a mechanical advantage to manually open and close the valve body 12 under the operating pressure thereof. To manually shut-off the CVA 10, e.g., for maintenance purposes or to turn off sprinklers after a fire event is extinguished (in fire protection applications), a user rotates the hand wheel 24 to rotate the ball 16 into the closed position thereof. To return the CVA 10 into the normal operating condition thereof (FIGS. 2, 3), the user rotates the hand wheel 24 in the opposite direction to rotate the ball 16 back to the open position thereof.

The valve body 12 may also be provided in a conventional fashion with one or more internal supervisory switches, i.e., a tamper evident switch, which operate(s) in a manner well understood by those of ordinary skill in the art, and which is operatively connected to the valve body 12 in a conventional manner. As one example, without limitation, the supervisory/tamper switch can be actuated by a cam (not shown), within the valve actuation assembly 22, operatively connected to a valve stem (not shown) of the valve body 12 in a conventional fashion so as to change the state of the switch within a predetermined number of turns of the hand wheel 24. The supervisory switch is also connected in a manner well understood by those of ordinary skill in the art to a monitoring system (not shown), which produces a warning signal to energize an alarm, turn on a light, or the like in the event an unauthorized person starts to open or close the valve body 12 of the CVA 10.

Figure 2:
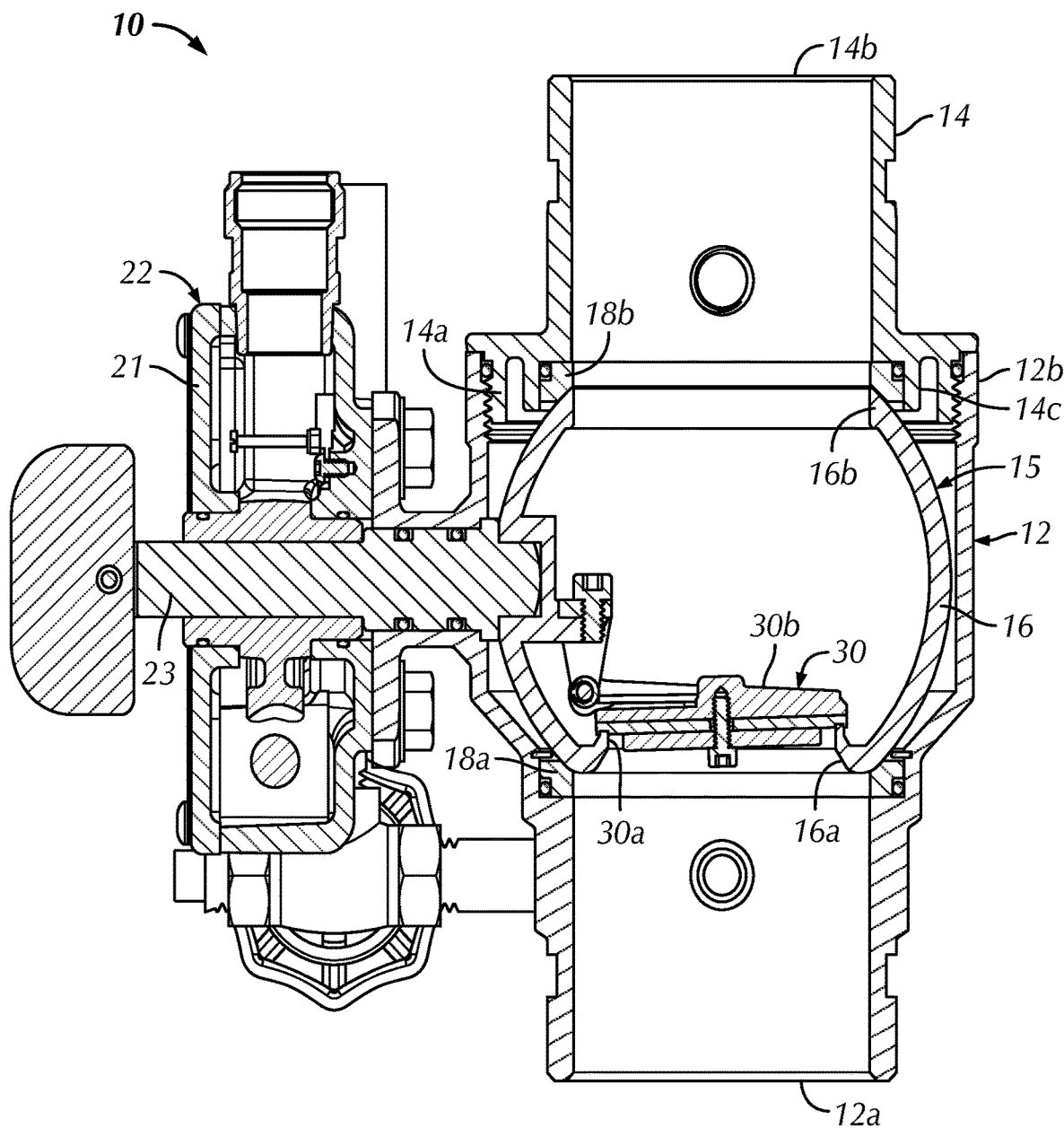
FIG. 2 is a cross-sectional view of the control valve assembly of FIG. 1, taken along the sectional line 2-2 of FIG. 1, with the control valve in an open position.
Figure 3:
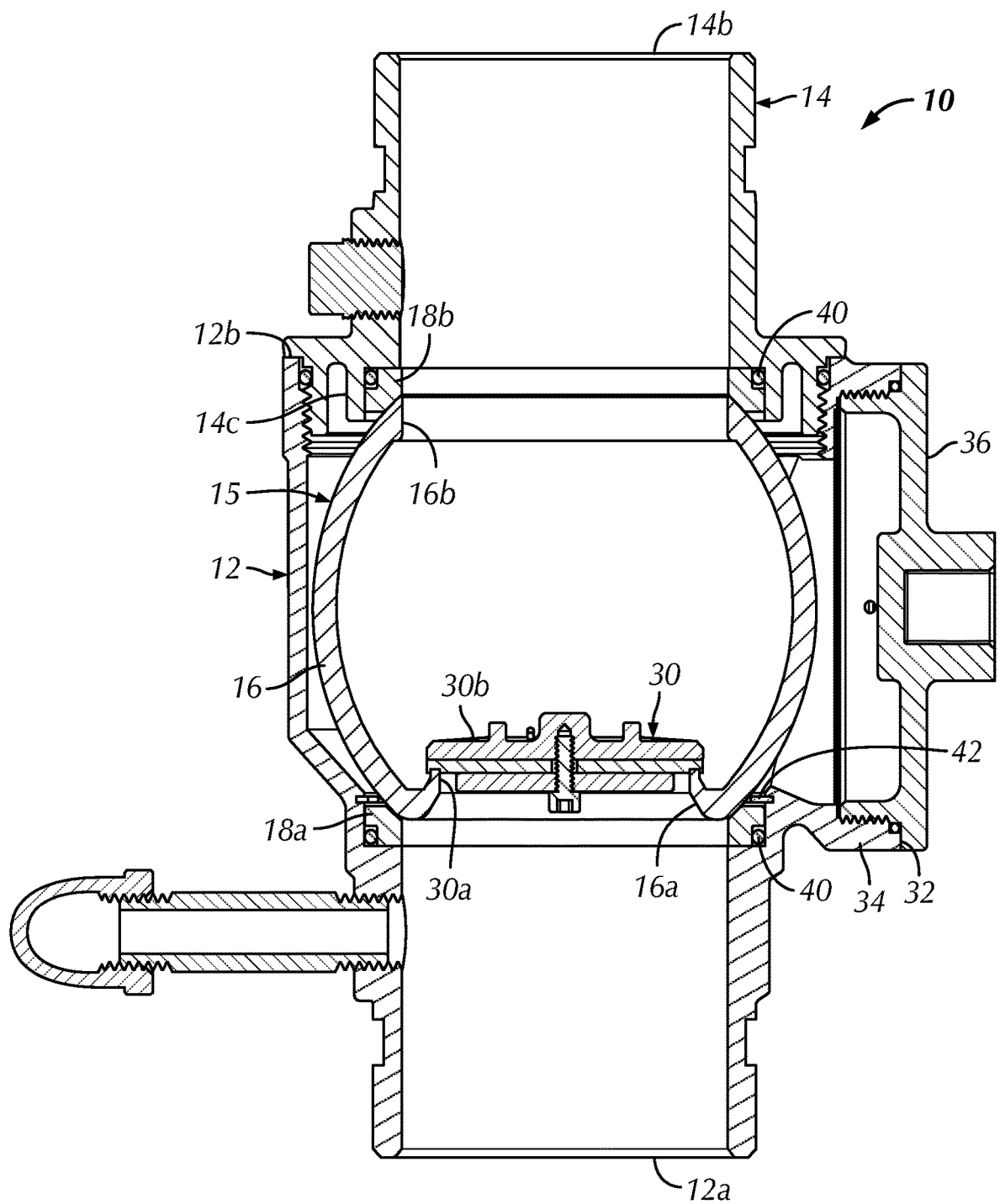
FIG. 3 is a cross-sectional view of the control valve assembly of FIG. 1, taken along the sectional line 3-3 of FIG. 1, with the control valve in the open position.
Figure 4:
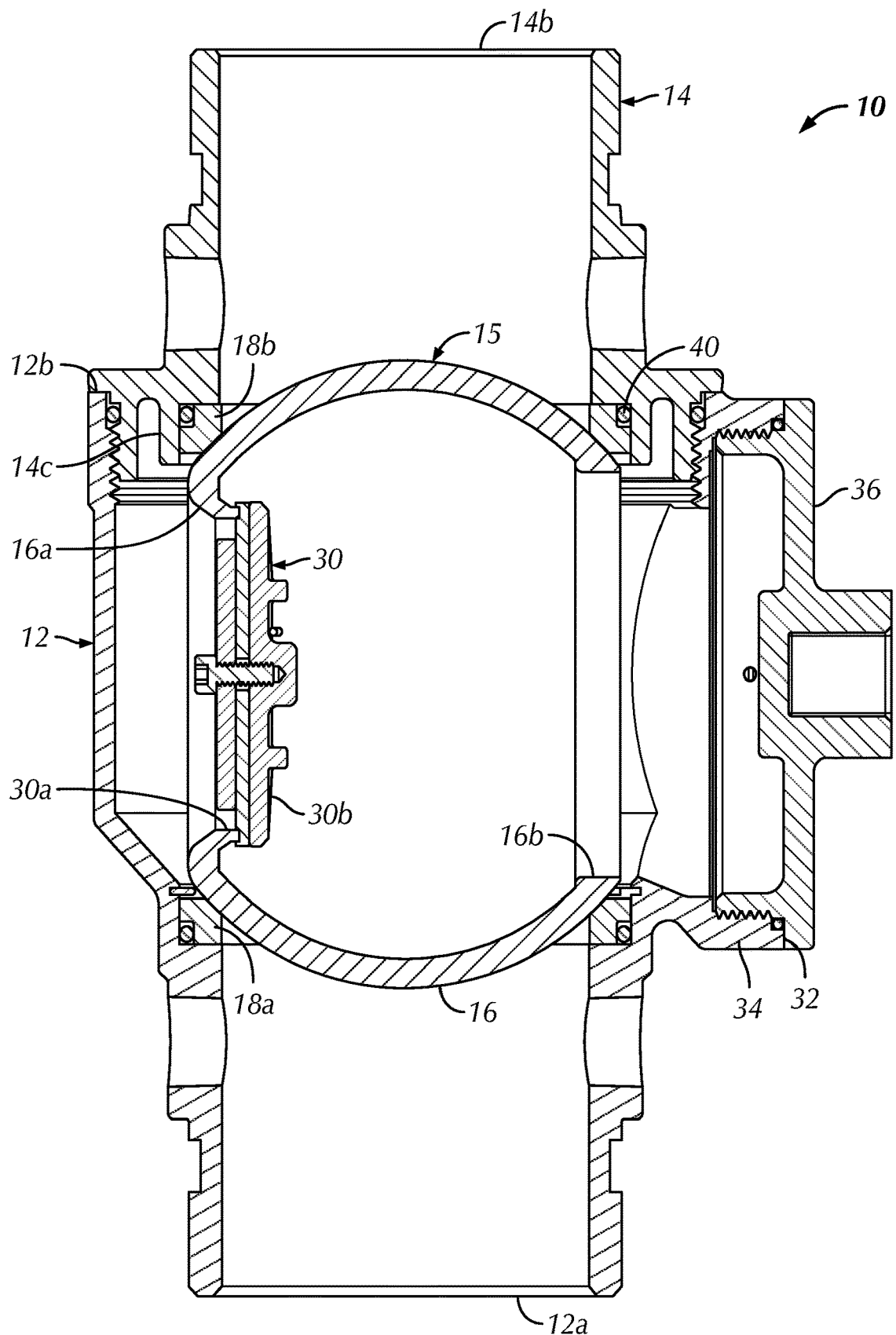
FIG. 4 is a cross-sectional view of the control valve assembly of FIG. 1, taken along the sectional line 3-3 of FIG. 1, with the control valve in a closed position.

As shown best in FIGS. 2-4, a check valve 30 may optionally be positioned within the ball 16 of the ball valve 15, forming a combined check and control valve, but the disclosure is not so limited. As one example, the check valve 30 may be mounted in a separate valve body (not shown) that is connected to the valve body 12, whereby the control valve 15 and check valve 30 operate in series. Alternatively, the CVA 10 may be manufactured without a check valve 30.

In the illustrated embodiment, the check valve 30 takes the form of a clapper valve. As should be understood by those of ordinary skill in the art, however, the check valve 30 is not limited to a clapper valve and may take the form of other one-way valves substantially preventing backflow of liquid, currently known or that later become known, capable of performing the functions of the check valve 30 described herein. For example, without limitation, the check valve 30 may take the form of a wafer valve, a butterfly valve, a valve having a generally disk-shaped closure pivotable about an axis along a cross-section of a pipe to regulate direction of fluid flow, or the like.

The check valve 30 includes an endless, e.g., annular, valve seat 30a and a removable clapper disk 30b which is pivotable between an open position (not shown) and a closed position (FIGS. 2-4) according to the fluid pressure differential across the clapper disk 30b. In the closed position of the check valve 30, the clapper disk 30b sealingly engages the valve seat 30a to prevent fluid from flowing through the check valve 30 from the outlet side 14b of the CVA 10 to the inlet side 12a of the CVA 10, and in the open position of the check valve 30, the clapper disk 30b is pivoted upwardly away from the valve seat 30a and fluid, e.g., water, is permitted to flow through the check valve 30 from the inlet side 12a to the outlet side 14b. A biasing member (not shown), e.g., a torsion spring, may be mounted to the inside of the ball 16 and attached to the clapper disk 30b. The biasing member exerts a predetermined spring force on the clapper disk 30b to maintain the clapper disk 30b in sealed engagement with the valve seat 30a. The biasing force of the biasing member may be overcome by a sufficient pressure differential across the clapper disk 30b that results in a force against the clapper disk 30b that is greater than the biasing force and opposite in direction. As should be understood by those of ordinary skill in the art, the clapper disk 30b may alternatively be maintained in sealed engagement with the valve seat 30a via the force of gravity or other biasing members currently known or that later become known, capable of performing the function of the biasing member described herein.

As should be understood by those of ordinary skill in the art, because the CVA 10 is fluidly connected to a fluid-filled conduit/pipe, e.g., a wet standpipe (not shown), the valve body 12 is always filled with water and pressurized. In one non-limiting embodiment where a check valve 30 is employed, fluid pressure differential across the check valve 30 also maintains the clapper disk 30b in the closed position, i.e., fluid pressure is greater on the downstream side than the upstream side. A decrease in the fluid pressure on the downstream side of the check valve 30 (e.g., when a sprinkler system is activated by a thermal event, e.g., a fire, and resulting in spraying of the sprinklers in a fire protection application) causes a pressure differential across the clapper disk 30b that equates to a force greater than the spring force of the spring, and, therefore, pivots the clapper disk 30b to the open position for water to flow through the check valve 30 (e.g., and to the sprinklers (not shown)).

In the illustrated embodiment, the valve seat 30a is integrally formed, i.e., monolithic, within the ball 16, but the disclosure is not so limited. As shown in FIGS. 2-4, the valve seat 30a projects radially inwardly from the interior sidewall of the ball 16, i.e., forming an annular lip for receiving the clapper disk 30b thereon in the closed position of the check valve 30. The clapper disk 30b is removably, pivotably attached within the ball 16 to permit removal and replacement thereof if necessary (as will be described in further detail below). Alternatively, the entirety of the check valve 30, i.e., the valve seat and the clapper disk, may be removably mounted in the ball 16.

Optionally, at least some components of the ball valve 15 and the check valve 30 are both coated with a corrosion resistant coating, such as, for example, without limitation, a chrome coating. In one embodiment, for example, the ball 16 and the clapper disk 30b may be coated with a corrosion resistant coating. In another embodiment, the valve seat 30a may also be coated with a corrosion resistant coating.

An exemplary operation of the CVA 10 specifically in a fire protection system application will now be described, but the disclosure is not limited to such applications. Rather, the CVA 10 is equally operable in alternative fluid flow control applications. As shown best in FIGS. 2 and 3, the inlet and outlet ends 16a, 16b of the ball are oriented in line with fluid flow when the ball control valve 15 is in the open position thereof. The check valve 30 is oriented substantially perpendicularly to the direction of fluid flow when the ball control valve 15 is in the open position thereof. Accordingly, when the ball valve 15 is in the open position thereof, the check valve 30 operates in a normal manner. That is, fluid pressure differential across the check valve 30 maintains the clapper disk 30b in the closed position, i.e., fluid pressure is greater on the downstream (sprinkler) side than the upstream (water supply) side. When the sprinkler system is activated by a thermal event, e.g., a fire, a decrease in the fluid pressure on the downstream side of the check valve 30, resulting from spraying of the sprinkler heads, causes a pressure differential across the clapper disk 30b that pivots the clapper disk 30b to the open position for water to flow through the check valve 30 and to the sprinkler heads. To manually shut-off the CVA 10, e.g., for maintenance purposes or to turn off sprinklers after a fire event is extinguished, a user rotates the hand wheel 24 to rotate the ball 16 into the closed position thereof (FIG. 4).

As shown in FIGS. 1, 3 and 4, a side opening 32 may optionally be provided in the sidewall of the valve body 12, adjacent the ball 16, to provide access to an interior of the ball 15. In the illustrated embodiment, the side opening 32 defines an open end of a throat 34 extending from the generally tubular sidewall of the valve body 12, but the disclosure is not so limited. The side opening 32 is sized and dimensioned to permit passing of the components of the check valve 30 therethrough, i.e., at least the clapper disk 30b and also the valve seat 30a (if removably mounted within the ball 16). The side opening 32 is positioned to align with the inlet 16a and outlet 16b of the ball 16 when the ball valve 15 is oriented in the closed position (FIG. 4), thereby facing the check valve 30. That is, when the ball valve 15 is rotated substantially 90° from the open position thereof, into the closed position, the inlet 16a and outlet 16b of the ball 16 align with the side opening 32. A removable side cover 36 sealingly closes the side opening 32 in a manner well understood by those of ordinary skill in the art, such as, for example, without limitation, via a threaded engagement with the throat 34 in the illustrated embodiment.

Advantageously, the side opening 32 permits access to the check valve 30 when the ball valve 15 is oriented in the closed position. Accordingly, inspection and/or maintenance of the check valve 30 is greatly simplified. For example, when the ball valve 15 is moved into the closed position, the side cover 36 may be removed to access the check valve 30. Should the clapper disk 30b require replacement it may be disconnected from the valve seat 30a and the ball 16, permitting removal and replacement thereof through the side opening 32. Where the entirety of the check valve 30 is removably mounted in the ball 16, the entire check valve 30 may be removed and repaired/replaced. Alternatively, the check valve 30, or at least the clapper disk 30b, may be removed and not replaced, for use of the ball valve 15 by itself. Because the ball valve 15 is in the closed position, water flow is stopped during such maintenance (as described in further detail below) and the check valve 30 is substantially isolated from the water on both the upstream and the downstream side of the check valve 30. Advantageously, therefore, the need to drain the entire system prior to conducting inspection and/or maintenance of the check valve 30 is eliminated.

Further advantageously, and as shown best in FIG. 1, the side opening 32 of the valve body 12 is angularly spaced from the valve actuation assembly 22 along the sidewall of the valve body 12 sidewall. As one example, if the valve actuation assembly 22 is mounted to the valve body 12 on a side identified as the "front" or "back" side of the valve body 12, i.e., the stem 23 extends through the valve body 12 into engagement with the ball 16 through the "front" or "back" side of the valve body 12, respectively, then the side opening 32 may be formed in a side of the valve body 12 identified as the "left" or "right" side, i.e., angularly spaced approximately 90° from the "front" or "back" side of the valve body 12 Therefore, access to the ball 16 through the side opening 32 does not interfere with operation of the valve actuation assembly 22. Advantageously, therefore, stabilization of the ball 16 by the valve actuation assembly 22 is unaffected while accessing the check valve 30 through the side opening 32, thereby minimizing risk of injury to a technician that may otherwise arise due to movement of the ball 16 under pressure in the water flow line.

As previously described, because the CVA 10 is fluidly connected to a fluid filled conduit/pipe, e.g., a wet standpipe (not shown), the valve body 12 is always filled with water and pressurized. As also should be understood by those of ordinary skill in the art, the ball 16 is positioned in the fluid flow path within the valve body 12. Accordingly, for embodiments of the CVA 10 employing a check valve 30 and equally for embodiments of the CVA 10 without a check valve 30, the seat rings 18a, 18b play a primary role in proper function of the ball valve 15 by substantially sealing off water flow from around the ball 16, such that water may only flow through the ball 16 when the ball valve 15 is in the open position.

The ball 16 is exposed to fluid pressure on both the upstream side thereof and the downstream side thereof, and, therefore, subject to pressure differential across the ball 16. When the fluid pressure is greater on the upstream side of the ball 16 than the downstream side thereof, for example, the pressure presses the ball 16 against the downstream seat ring 18b, i.e., the seat ring on the lower pressure side of the ball 16. Conversely, when the fluid pressure is greater on the downstream side of the ball 16 than the upstream side thereof, the pressure presses the ball 16 against the upstream seat ring 18a (the lower pressure side). The seat ring that is compressed by the ball 16 (against the inner sidewall of valve body 12) according to the fluid pressure differential is "activated" by the compression, i.e., provides proper sealing with the opposing inner sidewall of the valve body 12 to substantially prevent water leakage therebetween. Conversely, the seat ring on the higher-pressure side of the ball 16 may not be sufficiently "activated" without adequate compression of the ball 16 thereon.

In the illustrated embodiment (with or without a check valve 30), the seat rings 18a, 18b each take the form of a reciprocating, piston style dynamic seat ring (shown best in FIG. 5) to provide additional sealing compression at both seat rings 18a, 18b. The following description of a dynamic seat ring 18 pertains to each of the seat rings 18a, 18b. The seat ring(s) 18 includes an annular groove 38 in an outer peripheral sidewall thereof, and a compressible/deformable O-ring 40 received in the groove 38 and at least partially compressed between the groove 38 and an opposing inner sidewall of the valve body 12 (or bonnet 14). The seat ring 18 may also define a diametrical clearance from the opposing inner sidewall of the valve body 12 (or bonnet 14) to facilitate axial seat ring 18 reciprocation according to differential pressure. The diametrical clearance of the seat ring 18 from the opposing inner side sidewall of the valve body 12 (or the bonnet 14) (i.e., the seat ring 18 diameter), in combination with the annular groove 38 diameter, height and depth, and the O-ring 40 durometer, thickness/cross-section and inside diameter are configured to enable the O-ring 40 to balance consistent partial compression of the O-ring 40 between the groove 38 and the opposing inner sidewall of the valve body 12 (or bonnet 14) while also facilitating axial reciprocation of the O-ring 40 (within the groove 38) and the corresponding seat ring 18 relative to one another. As should be understood, the diametrical clearance between the seat ring 18 and the opposing inner side sidewall of the valve body 12 is less than the thickness/cross-section of the O-ring 40.

As system pressure activates the seat ring 18, the differential pressure across the seat ring 18 axially reciprocates the O-ring 40 and the seat ring 18 relative to one another to: (i) press the seat ring 18 against the ball 16 and seal the surface therebetween, and (ii) axially translate the O-ring 40 within the groove 38 toward the lower pressure side of the groove 38 to further compress/deform the O-ring 40 to sufficiently fill and seal the diametrical clearance between the seat ring 18 and the opposing inner sidewall of the valve body 12. Advantageously, therefore, the seat ring 18 (a, b) on the higher pressure side of the ball 16 (i.e., that may not otherwise be sufficiently compressed by the ball 16 under the pressure differential across the ball 16) nevertheless provides active sealing as the pressure differential also acts on the O-ring 40 and the respective seat ring 18 to compress the O-ring 40 into proper sealing engagement between the seat ring 18 and the opposing inner sidewall of the valve body 12 (or the bonnet 14) and also press the seat ring 18 against the ball 16 into proper sealing engagement with the ball 16.

During rotation of the ball valve 15 between the open and closed positions, the inlet opening 16a of the ball 16 passes over portions of the seat ring 18a, whereby those portions of the seat ring 18a may lack axial support on the downstream side thereof while also being exposed to the fluid pressure (as described above) on the upstream side thereof. As a result, the portions of the seat ring 18a exposed to the opening 16a of the ball 16 may be subject to deformation, e.g., bending, into the inlet opening 16a of the ball 16. Such deformation may compromise the sealing of the seat ring 18a and permit water to temporarily seep in around the ball 16 during rotation of the ball valve 15 between the open and closed positions. Additionally, such deformation of portions of the seat ring 18a, e.g., bending of portions into the inlet opening 16a, may cause grinding of the seat ring 18a upon the edges of the opening 16a, and, in turn, factor into premature wear of the seat ring 18a. For example, in certain applications, such as, for example, valve certification testing, e.g., during a cyclic testing phase of safety certification testing requiring cycling of the ball valve 15 between the fully open and fully closed positions a predetermined number of cycles, including cycling while fluid is flowing through the valve 15, such premature wear of the seat ring 18a is exacerbated and may prevent the ball valve 15 from passing the testing. Moreover, grinding of the seat ring 18a upon the edges of the opening 16a increases operating torque of the ball valve 15, i.e., the torque required to rotate the ball valve 15 between the open and closed positions thereof, which may potentially result in total failure of the ball valve 15.

Figure 5:
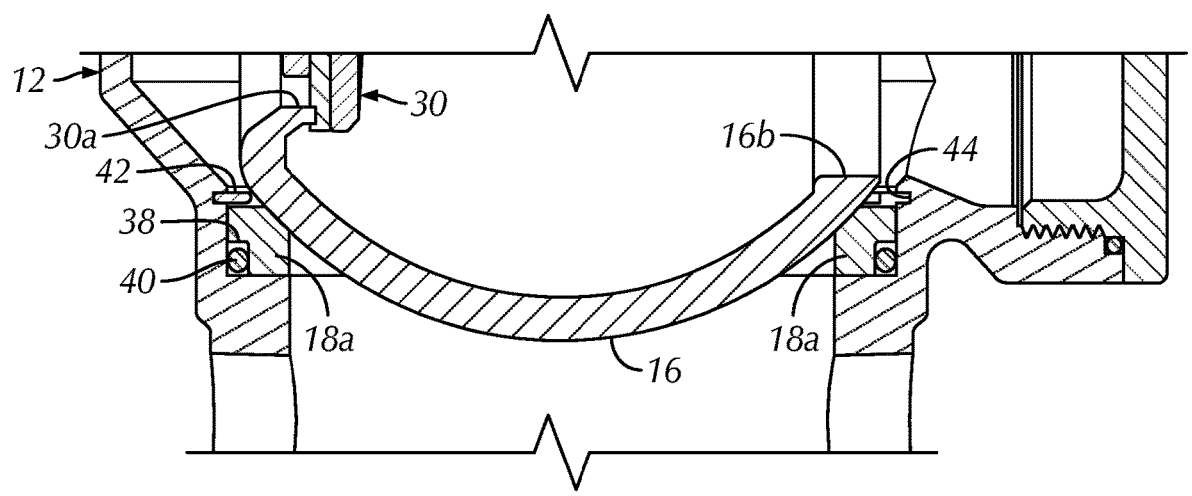
FIG. 5 is an enlarged, partial cross-sectional view of a seat ring and ring support surface of the control valve assembly of FIG. 4.

As shown best in FIG. 5, however, a mechanical stop/support surface 42 is positioned within the valve body 12 adjacent the seat ring 18a on an upstream side of the ball valve 15. In the illustrated embodiment, the mechanical stop takes the form a retainer ring 42, such as, for example, a split ring, but the disclosure is not so limited. In the illustrated embodiment, the valve body 12 includes an annular (circumferential) groove 44 in the sidewall thereof and the retainer ring 42 is seated in the groove 44. The retainer ring 42 is positioned downstream to the seat ring 18a and defines a clearance therebetween dimensioned to both avoid interference with the (previously described) axial reciprocation of the O-ring 40 and the seat ring 18a, and, advantageously, also substantially prevent, or at least minimize, bending of portions of the seat ring 18a. The circumferential retainer ring 42 operates as a stabilized stop surface for the seat ring 18a along the entire circumference of the seat ring 18a, irrespective of the position of the ball 16. As should be understood by those of ordinary skill in the art, the mechanical stop/support surface 42 may additionally, or alternatively, be employed to support the seat ring 18b as well. With respect to the seat ring 18b, however, the mechanical stop/support surface 42 would be positioned upstream thereof. Employing the mechanical stop/support surface 42 with both seat rings 18a, 18b, respectively, is advantageous for a CVA 10 without a check valve 30, thereby enabling a fitter to orient the CVA 10 as desired during installation, i.e., a fitter may determine which side of the CVA 10 should be the inlet side and which should be the outlet side. Nevertheless, the mechanical stop/support surface 42 may be employed with either one, or both, of the seat rings 18a, 18b, irrespective of the presence of a check valve 30.

Advantageously, the dynamic seat ring(s) 18a, 18b are expected to reduce the operating torque of the ball valve 15 under all pressure conditions of the ball valve 15 due to the reciprocating nature of the seat ring(s) 18a, 18b. That is, the dynamic seat ring(s) 18a, 18b do not require the initial mechanical pre-load conventionally placed on non-dynamic seat rings to establish sealing at lower pressures (which factors into operating torque as should be understood by those of ordinary skill in the art), because fluid pressure differential across the ball valve 15 will act to reciprocate/shift the seat ring 18a, 18b and/or the ball 16 to provide initial sealing (as previously described) without the mechanical pre-load. Further advantageously, the mechanical stop/support surface 42 serves to limit the reciprocation of the seat ring(s) 18a, 18b, thereby maintaining the reduced operating torque of the ball valve 15 enabled by the dynamic seat ring(s) 18a, 18b, while also mitigating against the previously described deformation of the seat ring(s) 18a, 18b and/or grinding of the seat ring(s) 18a, 18b on the opening of the ball 16, and the previously described problems associated therewith.

In an alternative optional configuration, at least one of the seat rings 18a, 18b may nevertheless take the form of a non-dynamic seat ring without the O-ring 40. For example, without limitation, the seat ring 18a on the upstream side of the ball 16 may be a non-dynamic seat ring. That is, the seat ring may be dimensioned (in combination with the dimensions of the ball 16 and the valve body 12) to define an interference fit between the ball 16, the seat ring and the valve body 12, whereby the seat ring is under compression, i.e., mechanical preload, even in low fluid pressure states. The addition of the mechanical stop/support surface 42 adjacent the non-dynamic seat ring will maintain the previously described advantage of mitigating against deformation of the seat ring and/or grinding of the seat ring on the opening of the ball 16, permitting the use of more compliant materials for the seat ring, as it is supported during opening of the ball 16 by the mechanical stop/support surface 42.

It will be appreciated by those skilled in the art that various modifications and alterations could be made to the embodiment(s) described above without departing from the broad inventive concepts thereof. Some of these have been discussed above and others will be apparent to those skilled in the art. It is understood, therefore, that this invention is not limited to the particular embodiments disclosed, but it is intended to cover modifications within the spirit and scope of the present disclosure, as set forth in the appended claims.

We claim:

1. A control valve assembly comprising:
   a valve body defining an inlet, an outlet and a valve body fluid flow pathway therebetween;
   a quarter-turn ball valve positioned within the valve body fluid flow pathway, the ball valve comprising:
   a rotatable ball having an inlet opening, an outlet opening and a ball fluid flow pathway therebetween,
   an upstream seat ring positioned at an inlet side of the ball, and
   a downstream seat ring positioned at a downstream side of the ball,
   the upstream and downstream seat rings being configured to substantially seal off fluid flow between an upstream side and a downstream side of the ball except through the ball fluid flow pathway, and
   at least one of the upstream and downstream seat rings being a dynamic sealing seat ring;
   a non-sealing retainer ring positioned between the dynamic sealing seat ring and a portion of the rotatable ball and configured to substantially prevent deformation of a portion of the dynamic sealing seat ring in a direction toward the ball; and a valve actuation assembly configured to selectively rotate the ball substantially 90° between only two operative positions, a first operative position being an open position, fluidly connecting the ball fluid flow pathway with the valve body fluid flow pathway to permit fluid flow from the inlet to the outlet of the valve body through the ball, and a second operative position being a closed position, substantially fluidly disconnecting the ball fluid flow path from the valve body fluid flow path to substantially prevent fluid flow from the inlet to the outlet of the valve body, the valve actuation assembly including a stem extending from outside the valve body, through a first side thereof and into rotationally fixed attachment with the ball, whereby rotation of the stem rotates the ball between the open and closed positions thereof irrespective of a pressure differential across the ball.

2. The control valve assembly of claim 1, wherein the retainer ring is spaced from the dynamic sealing seat ring in the direction toward the ball, thereby permitting axial reciprocation of the dynamic sealing seat ring according to a pressure differential across the dynamic sealing seat ring.

3. The control valve assembly of claim 1, wherein the retainer ring is seated in an annular groove in an opposing inner sidewall of the valve body.

4. The control valve assembly of claim 1, wherein the upstream seat ring is a dynamic sealing seat ring and the downstream seat ring is a dynamic sealing seat ring, and the retainer ring is positioned between one of the dynamic sealing seat rings and a portion of the rotatable ball.

5. The control valve assembly of claim 1, wherein each dynamic seat ring includes an annular groove in a peripheral sidewall thereof and a compressible O-ring mounted in the groove, the O-ring being partially compressed between the groove and an opposing inner sidewall of the valve body, the O-ring and the groove being axially reciprocal relative to one another according to a differential pressure across the seat ring to axially translate one of the O-ring and the groove relative to the other of the O-ring and the groove and further compress the O-ring between the groove and the opposing inner sidewall of the valve body.

6. A control valve assembly comprising:
a valve body defining an inlet, an outlet and a valve body fluid flow pathway therebetween;
a quarter-turn ball valve positioned within the valve body fluid flow pathway, the ball valve comprising:
a rotatable ball having an inlet opening, an outlet opening and a ball fluid flow pathway therebetween,
an upstream seat ring positioned at an inlet side of the ball, and
a downstream seat ring positioned at a downstream side of the ball,
the upstream and downstream seat rings being configured to substantially seal off fluid flow between an upstream side and a downstream side of the ball except through the ball fluid flow pathway, and
at least one of the upstream and downstream seat rings being a dynamic sealing seat ring, wherein each dynamic seat ring includes an annular groove in a peripheral sidewall thereof and a compressible O-ring mounted in the groove, the O-ring being partially compressed between the groove and an opposing inner sidewall of the valve body, the O-ring and the groove being axially reciprocal relative to one another according to a differential pressure across the seat ring to axially translate one of the O-ring and the groove relative to the other of the O-ring and the groove and further compress the O-ring between the groove and the opposing inner sidewall of the valve body, and wherein each dynamic seat ring defines a diametrical clearance from the opposing inner sidewall of the valve body that is smaller than a thickness of the O-ring;

a non-sealing retainer ring positioned between the dynamic sealing seat ring and a portion of the rotatable ball and configured to substantially prevent deformation of a portion of the dynamic sealing seat ring in a direction toward the ball; and a valve actuation assembly configured to selectively rotate the ball substantially 90° between only two operative positions, a first operative position being an open position, fluidly connecting the ball fluid flow pathway with the valve body fluid flow pathway to permit fluid flow from the inlet to the outlet of the valve body through the ball, and a second operative position being a closed position, substantially fluidly disconnecting the ball fluid flow path from the valve body fluid flow path to substantially prevent fluid flow from the inlet to the outlet of the valve body, the valve actuation assembly including a stem extending from outside the valve body, through a first side thereof and into rotationally fixed attachment with the ball, whereby rotation of the stem rotates the ball between the open and closed positions thereof irrespective of a pressure differential across the ball.

7. The control valve assembly of claim 6, wherein the non-sealing retainer ring is a split ring.

8. The control valve assembly of claim 1, further comprising:
a one-way check valve mounted within the ball, the check valve being movable according to a pressure differential across the check valve between a closed position, blocking fluid flow through the ball fluid flow pathway, and an open position, permitting fluid flow through the ball fluid flow pathway in a direction from the inlet side to the outlet side thereof.

9. The control valve assembly of claim 8, wherein the check valve comprises an endless valve seat and a pivotable clapper disk, the clapper disk being in sealed engagement with the endless valve seat in the closed position thereof and the clapper disk being spaced away from the endless valve seat in the open position thereof.

10. The control valve assembly of claim 8, further comprising a side opening formed in a side of the valve body, the side opening being positioned to align with and access the ball fluid flow pathway in the closed position of the ball, and the side opening being dimensioned to permit passage of the check valve therethrough; and
a side cover removably closing the side opening.

11. The control valve assembly of claim 10, wherein the side opening is formed in a second side of the valve body that is angularly spaced approximately 90° from the first side of the valve body.

12. The control valve assembly of claim 1, wherein the non-sealing retainer ring is a split ring.

* * * * *